ptOffice 3,541,788
Patented Nov. 24, 1970

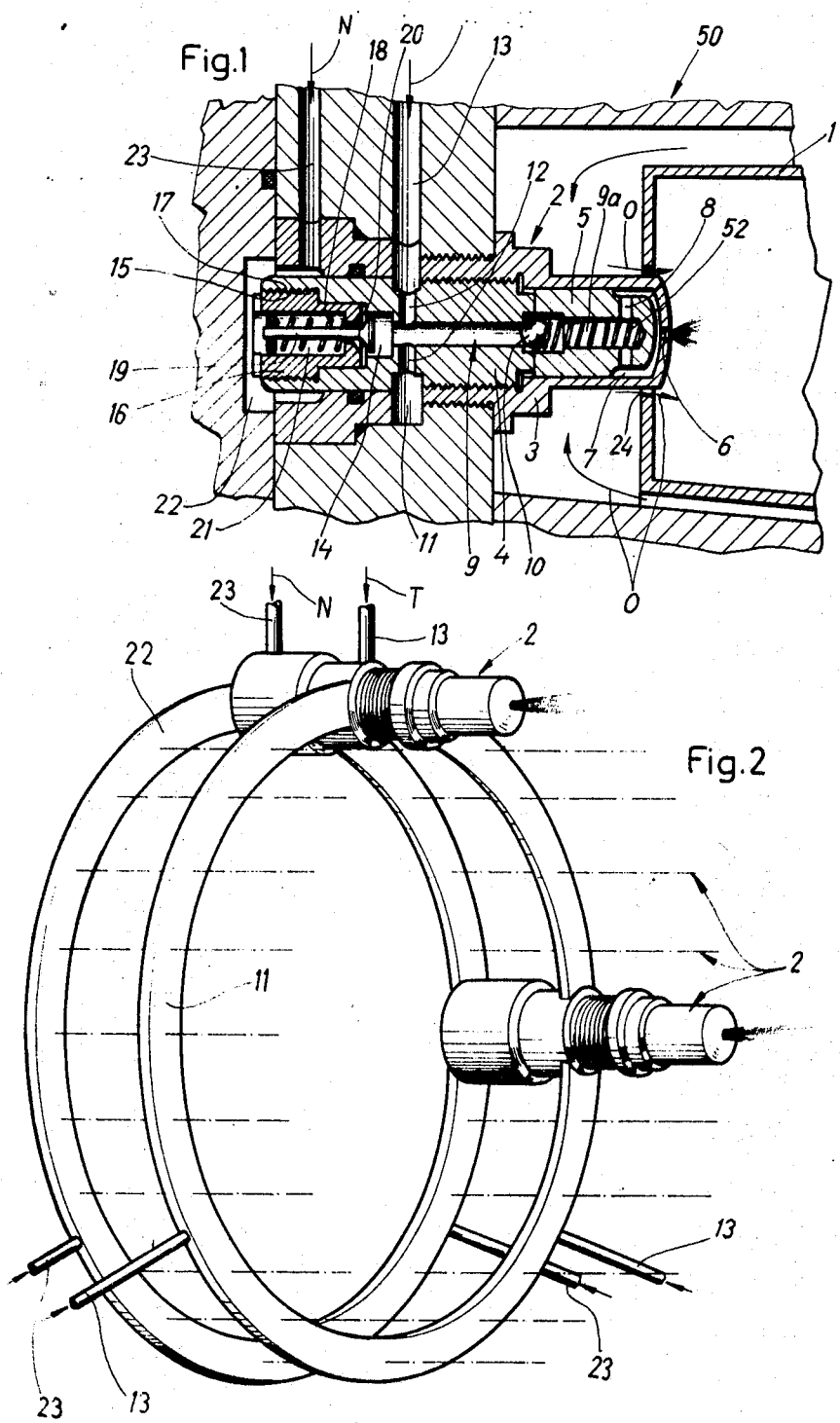

3,541,788
NOZZLE CONSTRUCTION AND LIQUID FUEL ROCKET FUEL SYSTEM
Manfred Schutz, Ottobrunn, Germany, assignor to Bolkow Gesellschaft mit beschrankter Haftung, Ottobrunn, Germany
Filed May 3, 1968, Ser. No. 726,368
Int. Cl. F02c 7/22; F02k 9/02
U.S. Cl. 60—39.09         6 Claims

ABSTRACT OF THE DISCLOSURE

An injection nozzle system for liquid fuel rocket engines comprises a plurality of injection nozzle housings mounted at spaced locations around two spaced ring conduits, one of which is for supplying fuel and the other of which is for supplying a scavenging agent such as nitrogen. The fuel is delivered under pressure to a central conduit ahead of a valve which seals off a chamber to which the scavenging agent is supplied. As long as the fuel is being delivered and maintained under pressure, the valve at the inner end of the central conduit will close off the connection to the scavenging agent supply. However, when the fuel pressure drops and when the engine is to be shut off, the valve will open and permit the scavenging agent to move through the central conduit and to be discharged into the combustion chamber to scavenge the remaining fuel from the system.

SUMMARY OF THE INVENTION

This invention relates in general to the construction of fuel nozzles and fuel nozzle systems and in particular to a new and useful fuel nozzle and fuel nozzle system for a liquid fuel rocket engine which includes means for scavenging the passages of the nozzle with a scavenging agent when the fuel supply pressure is reduced as when the engine is shut down.

The present invention is particularly applicable for liquid fuel rocket engines of the main current type which includes an annular combustion chamber which is arranged as a pre-combustion chamber. In such a construction it is usual to mount the fuel nozzles so that they protrude into each annularly arranged pre-combustion chamber and they are advantageously supplied with fuel through a common ring conduit which in turn is connected to a duct which is secured to the rear portion of the main combustion chamber.

When shutting off rocket engines which are operated with liquid fuel of a type such as, for example, kerosene and liquid oxygen, there is a danger that when the delivery of the liquid fuel stops, hot combustion gases will flow from the combustion chamber back into the injection nozzles so that they are subject to damage. An even greater risk during the shut-off of the engine is that when the fuel delivery stops, a portion of the fuel component, in this case kerosene, becomes too high so that heat damages are unavoidable.

Rocket engines of the main current type include a turbine, which serves to drive auxiliary units such as fuel and oxygen pumps, electrical generators, regulators, etc. The nozzle systems are arranged behind the pre-combustion chambers and hot oxygen-rich gases which are generated in the pre-combustion chamber are used to propel the turbine and thereafter are directed to the main combustion chamber. In such a system the temperature increase might possibly lead to the overheating of a turbine runner which is very sensitive in this respect.

In order to avoid the above disadvantages, the injection nozzle system is scavenged at the end of the delivery of the components with a non-combustible gas such as nitrogen. In this case nitrogen is injected into the fuel supply lines connected to the fuel ring conduit after the fuel supply has been shut off. But even this preventive measure leads to complications because of the considerable amount of residual fuel that still exists in the fuel ring conduit and which is driven by the nitrogen ahead of it into the combustion chamber. This also produces temporarily inadmissible high temperatures. In rocket engines of the main current type, this also leads to heat damage of the turbine running behind the pre-combustion chamber.

In accordance with the present invention, the disadvantages mentioned above are avoided by providing an apparatus which insures a safe shut-off of the engine and a satisfactory scavenging of the fuel from the system. For this purpose, each nozzle duct is connected with a scavenging system through a control valve which is designed as a relief valve and opens whenever the fuel pressure reduces by a certain amount. In an embodiment of the invention there is provided a scavenging ring conduit and a fuel conduit which are connected at spaced axial locations in respect to a plurality of injection nozzles. The fuel is admitted through a central fuel duct in each nozzle which is closed at the discharge end by a pressure valve which opens when the fuel pressure reaches a predetermined amount to permit discharge into the combustion chamber. In addition, the fuel conduit at its opposite end is closed by a valve at the inner end of a scavenging agent compartment which is supplied with a scavenging agent such as nitrogen. The normal operating pressure of the fuel prevents admission of the nitrogen because it acts against the valve in the nitrogen chamber and it closes this chamber off from the fuel chamber. However, as soon as the fuel pressure is reduced by the setting amount, the nitrogen will enter the system and purge the system of the fuel.

With the inventive construction, the disadvantages of flushing the injection nozzle system with an uncombustible scavenging agent when the engine is shut off are avoided and the scavenging agent is admitted automatically and into each nozzle upon fuel pressure shut-down.

Accordingly it is an object of the invention to provide a fuel nozzle, particularly for a liquid fuel rocket engine which includes a fuel passage which connects to the fuel supply and to a scavenging agent supply and wherein the scavenging agent is prevented from flowing through the fuel discharge passage whenever fuel is present in such passage but which may flow through the passage to scavenge the fuel therefrom whenever the fuel pressure drops by a predetermined amount.

A further object of the invention is to provide a fuel and scavenging system for rocket engines which includes a plurality of nozzle members arranged in an annular grouping and mounted for connection to two spaced ring conduits, one of which is a conduit for supplying a scavenging agent and wherein the nozzles each have means for permitting flow of the scavenging agent into the nozzle and through the fuel passage when the fuel supply pressure is reduced by a predetermined amount such as when the engine is shut down.

A further object of the invention is to provide a nozzle construction in a fuel system which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

In the drawings:

FIG. 1 is a partial axial sectional view of a fuel injection nozzle arrangement in respect to a pre-combustion chamber constructed in accordance with the invention; and FIG. 2 is a perspective view of the mounting of a plurality of fuel nozzles on fuel and scavenging agent supply rings in accordance with the invention.

DETAILED DESCRIPTION OF THE PREFERRED EMBODIMENT

Referring to the drawings in particular, the invention embodied therein as indicated in FIG. 1 comprises a fuel system for a liquid fuel engine of the main current type generally designated 50 which, in the embodiment shown, includes a plurality of annularly arranged pre-combination chambers 1. The pre-combustion chambers 1 are designed to operate with oxygen-rich fuel gases and the combustion products are delivered at the discharge end through a turbine (not shown) which is arranged between it and a main combustion chamber (not shown). The turbine is provided for driving auxiliary units such as the fuel pumps (not shown).

In accordance with the invention, each pre-combustion chamber is provided with a fuel injection nozzle generally designated 2 which is arranged to project into the pre-combustion chamber 1 and which is located so that an annular space 24 is defined between the nozzle and the walls of the combustion chamber. The injection nozzle 2 comprises an outer nozzle body 3 which is threadably interengaged with an inner nozzle body 4 which bears against a head portion 5 arranged on the interior of the outer nozzle body 3.

The front end of the outer nozzle body 3 defines a nozzle discharge 6 which communicates through one or more radially and axially extending swirl passages or ducts 7 and a radial passage or duct 8 to a fuel delivery passage 9a defined in the head 5. The fuel delivery passage 9a communicates at its inner end with a main fuel supply passage or fuel supply conduit 9 but is sealed in respect to this passage when no fuel is flowing by a pressure valve which includs a ball member 10 and a spring 52 which biases the ball member to a closed position.

Fuel, as indicated by the arrow T, is directed through the plurality of fuel ducts or passages 13 to a fuel supply ring 11 which is shown in both FIGS. 1 and 2 and through radial nozzle duct supply bores or ducts 12 and into the fuel supply conduit 9 defined in the nozzle body 4. A uniform opening of all injection nozzles 2 is insured by the valves 10.

The rear end of the nozzle fuel supply conduit 9 is connected to the ring 11 and it in turn is connected to a scavenging medium valve chamber 14 of the nozzle body 4 which has a female thread 15 for receiving the male thread 17 of a valve housing 16. The scavenging control valve 19 is arranged within the valve housing 16 and it is designed as a relief valve and loaded by a spring 18 which opens only in the direction toward the supply conduit 9. During normal operation of the nozzle with fuel under pressure in the supply conduit 13 and the ring ducts 11 and connecting ducts 12 into the supply conduit 9, the valve 19 is closed and bears against its seat 20. The interior 21 of each valve housing 16 is connected to a common scavenging ring conduit 22 which is fed with a scavenging agent designated by the arrow N which is supplied in the embodiment shown over three separate scavenging medium supply lines 23.

The method of operating the system is as follows:

During the operation of the engine and of the combustion chamber 1, the nozzles 2 inject fuel T in finely atomized form into the combustion chamber 1. At the same time, oxygen is fed to the combustion chamber 1 through the ring slot 24 surrounding the front nozzle N. The pressure of the fuel T in the fuel supply conduit 9 keeps the scavenging control valve 19 closed. When the engine is shut off and the fuel supply stops, since the fuel pumps of the engine run down, pressure reduces and permits opening of the valve 19 against the force of the spring 18 under the force of the supply pressure of the scavenging agent. A non-combustible scavenging agent N, for example nitrogen, is introduced through the lines 23 and 22 to the interior 21 and the scavenging control valve 19 and the fuel supply duct 9 is scavenged down to the nozzle end discharge 6; since the valve 10 will open under the force of the scavenging pressure and any fuel remaining in the system will be expelled from the nozzles 2 and from the associated ducts 9.

A part of the scavenging agent N will also penetrate through the nozzle duct supply bores and into the fuel ring conduit 11. But the amount of such penetrating agent will be reduced by the amount of residual fuel which is still contained in these lines. In addition, in some instances it is desirable to provide a relief valve in the supply line 13 which may open only in the direction of flow of the fuel T.

By the scavenging arrangement any further delivery of fuel into the combustion chamber 1 will be stopped and only a very small amount of fuel remaining in the nozzle ducts and the supply conduit 9 of the injection nozzle 2 is driven into the combustion chamber 1. The residual amount of the fuel which remains is not capable of increasing the temperature in the combustion chamber or producing an explosive mixture in the combustion chamber. On the contrary, the inventive arrangement insures that the combustion chamber will be suddenly extinguished.

While a specific embodiment of the invention has been shown and described in detail to illustrate the application of the inventive principles, it will be understood that the invention may be embodied otherwise without departing from such principles.

What is claimed is:

1. A liquid fuel rocket engine scavenging system particularly for the fuel nozzles supplying one or more precombustion chambers of a main current rocket engine, comprising a fuel nozzle housing having a fuel supply conduit with one end adapted to discharge fuel into a combustion chamber, conduit means connected to said fuel supply conduit for supplying fuel to said fuel supply conduit under feed pressure, scavenging medium supply conduit means connected to said fuel supply conduit, a scavenging medium valve connected between said fuel supply conduit and said scavenging medium supply conduit means and exposed on one side to fuel pressure in said fuel supply conduit and being maintained closed under operating conditions by the fuel pressure in said fuel supply conduit to prevent flow of scavenging medium into said fuel supply conduit but being openable upon reduction of pressure in said fuel supply conduit, such as by the stopping of the engine, to permit flow of scavenging medium through said fuel supply conduit, said housing including a portion defining a scavenging medium valve housing and a valve seat opening into said fuel supply conduit, said valve being seated on said valve seat under the force of the fuel feed pressure in said fuel supply conduit, said fuel supply conduit and said valve being arranged coaxial in said housing parallel to the longitudinal axis of said housing, the interior of said scavenging medium valve housing being in communciation with said scavenging medium supply conduit means.

2. A liquid fuel rocket engine scavenging system particularly for the fuel nozzles supplying one or more precombustion chambers of a main current rocket engine, comprising a fuel nozzle housing having a fuel supply conduit with one end adapted to discharge fuel into a combustion chamber, conduit means connected to said fuel supply conduit for supplying fuel to said fuel supply conduit under feed pressure, scavenging medium supply conduit means connected to said fuel supply conduit, a scavenging medium valve connected between said fuel supply conduit and said scavenging medium supply conduit means and exposed on one side to fuel pressure in said fuel supply conduit and being maintained closed under operating conditions by the fuel pressure in said fuel supply conduit to prevent flow of scavenging medium into said fuel supply conduit but being openable upon reduction of pressure in said fuel supply conduit, such as by the stopping of the engine, to permit flow of scavenging medium through said fuel supply conduit, said fuel nozzle housing including an outer nozzle body, an inner nozzle body and a nozzle head portion arranged within said outer nozzle body, and means defining a scavenging valve chamber at the rear of said inner nozzle body, said valve being arranged within said valve chamber, said inner nozzle body being threaded into said outer nozzle body.

3. A liquid fuel rocket engine scavenging system particularly for the fuel nozzles supplying one or more precombustion chambers of a main current rocket engine, comprising a fuel nozzle housing having a relatively short fuel supply conduit with a first end adapted to discharge fuel into a combustion chamber and an opposite second end having a scavenger valve seat, conduit means connected to said fuel supply intermediate its length for supplying fuel to said fuel supply conduit under feed pressure, scavenging medium supply conduit means connected to said second end of said fuel supply conduit, and a scavenging medium valve exposed on its one side to fuel pressure in said fuel supply conduit and being maintained closed against said scavenging valve seat under operating conditions by the fuel pressure in said fuel supply conduit to prevent flow of scavenging medium into said fuel supply conduit but being openable upon reduction of pressure in said fuel supply conduit, such as by the stopping of the engine, to permit flow of scavenging medium through said fuel supply conduit.

4. A liquid fuel rocket engine scavenging system according to claim 3, including a plurality of fuel nozzles arranged in an annular arrangement, said scavenging medium supply conduit means comprising a ring conduit connected to all of said injection nozzles.

5. A liquid fuel rocket engine scavenging system according to claim 3, wherein said housing defines a widened scavenging medium valve chamber connected to said fuel supply conduit at an end opposite to said one end, said widened end being connected to said scavenging medium supply conduit means, said valve being located within said widened chamber.

6. A liquid fuel rocket engine scavenging system according to claim 3, including pressure relief valve means adjacent the discharge end of said fuel supply conduit permitting flow of fuel through said conduit for discharge into the combustion chamber upon reaching of a predetermined setting pressure.

References Cited

UNITED STATES PATENTS

| | | | |
|---|---|---|---|
| 2,312,686 | 3/1943 | Campbell | 137—113 |
| 2,641,273 | 6/1953 | Siebens | 222—6 XR |
| 2,907,527 | 10/1959 | Cummings. | |
| 3,262,263 | 7/1966 | Eng | 60—39.09 XR |
| 3,358,455 | 12/1967 | Hunt | 60—39.09 XR |

CARLTON R. CROYLE, Primary Examiner

U.S. Cl. X.R.

60—39.74, 258; 137—113; 222—148